United States Patent
Brockhaus et al.

(10) Patent No.: US 9,482,565 B2
(45) Date of Patent: Nov. 1, 2016

(54) MAGNETIC-INDUCTIVE FLOWMETER DEVICE HAVING A PLURALITY OF FLOWMETER UNITS, POWER SUPPLY AND EVALUATING UNITS PROVIDED IN A COMMON HOUSING

(71) Applicant: KROHNE AG, Basel (CH)

(72) Inventors: Helmut Brockhaus, Oberhausen (DE); Wilhelm Florin, Duisburg (DE)

(73) Assignee: Krohne AG, Basel (CH)

( * ) Notice: Subject to any disclaimer, the term of this patent is extended or adjusted under 35 U.S.C. 154(b) by 0 days.

(21) Appl. No.: 14/422,961

(22) PCT Filed: Aug. 17, 2013

(86) PCT No.: PCT/EP2013/002476
§ 371 (c)(1),
(2) Date: Feb. 20, 2015

(87) PCT Pub. No.: WO2014/029484
PCT Pub. Date: Feb. 27, 2014

(65) Prior Publication Data
US 2015/0204703 A1  Jul. 23, 2015

(30) Foreign Application Priority Data

Aug. 21, 2012 (DE) .................. 10 2012 016 404

(51) Int. Cl.
*G01F 1/58* (2006.01)
*G01F 1/60* (2006.01)

(52) U.S. Cl.
CPC .................. *G01F 1/588* (2013.01); *G01F 1/58* (2013.01); *G01F 1/60* (2013.01)

(58) Field of Classification Search
None
See application file for complete search history.

(56) References Cited

U.S. PATENT DOCUMENTS

| | | | | |
|---|---|---|---|---|
| 3,610,040 A | * | 10/1971 | Wada | G01F 1/586 73/861.12 |
| 3,710,622 A | * | 1/1973 | Hammond | G01F 1/125 73/861.84 |
| 4,262,542 A | | 4/1981 | Freund, Jr. et al. | |
| 4,543,822 A | * | 10/1985 | Sorrell | G01P 5/086 73/170.29 |
| 4,586,144 A | | 4/1986 | Fukumoto | |

(Continued)

FOREIGN PATENT DOCUMENTS

| | | |
|---|---|---|
| DE | 1179387 B | 10/1964 |
| DE | 8803594 U1 | 4/1988 |

(Continued)

*Primary Examiner* — Harshad R Patel
(74) *Attorney, Agent, or Firm* — David S. Safran

(57) ABSTRACT

A magnetic-inductive flowmeter has a plurality of functional units and a housing which is common to all of the functional units. Each functional unit has a measuring tube for an electrically conductive medium to flow through, a magnetic field-generating device having at least one field coil for generating a magnetic field which runs at least also perpendicular to the longitudinal axis of the measuring tube, and two measuring electrodes. A virtual connecting line between the measuring electrodes runs at least substantially perpendicular to the direction of the magnetic field which passes through the measuring tube. A common medium-inflow connection is created in the housing for the measuring tubes of all of the functional units, a common power supply is created for the magnetic field-generating device of all of the functional units, and a common evaluation unit is created for the measuring electrodes of all of the functional units.

18 Claims, 3 Drawing Sheets

(56) References Cited

U.S. PATENT DOCUMENTS

| | | | |
|---|---|---|---|
| 5,402,685 A | 4/1995 | Brobeil | |
| 5,503,026 A | 4/1996 | Bohm et al. | |
| 6,173,616 B1 | 1/2001 | Tomita | |
| 6,260,420 B1* | 7/2001 | Ketelsen | G01F 1/584 73/861.12 |
| 6,539,811 B2 | 4/2003 | Budmiger | |
| 6,693,486 B1* | 2/2004 | Brockhaus | G01F 1/60 330/124 R |
| 6,799,476 B2* | 10/2004 | Brockhaus | G01F 1/8431 73/861.356 |
| 6,807,867 B2* | 10/2004 | Brockhaus | G01F 1/60 73/861.12 |
| 6,895,813 B2 | 5/2005 | Mattar | |
| 7,114,400 B2* | 10/2006 | Florin | G01F 25/0007 73/861.12 |
| 7,117,750 B2 | 10/2006 | Brockhaus et al. | |
| 7,171,336 B2* | 1/2007 | Brockhaus | G01F 1/58 340/3.62 |
| 7,261,001 B2 | 8/2007 | Heijnsdijk et al. | |
| 7,472,606 B2* | 1/2009 | Seddon | G01F 1/8409 73/861.355 |
| 8,249,752 B2 | 8/2012 | Suzuki | |
| 8,286,503 B2 | 10/2012 | Neuburger et al. | |
| 8,819,656 B2 | 8/2014 | Budmiger et al. | |
| 2001/0013255 A1 | 8/2001 | Budmiger | |
| 2003/0167836 A1 | 9/2003 | Mattar | |
| 2004/0112595 A1* | 6/2004 | Bostick, III | E21B 21/08 166/250.01 |
| 2004/0129424 A1* | 7/2004 | Hosie | E21B 21/08 166/332.8 |
| 2010/0082168 A1 | 4/2010 | Suzuki | |
| 2010/0180692 A1* | 7/2010 | Reichart | G01F 1/58 73/861.11 |
| 2013/0061685 A1 | 3/2013 | Brockhaus et al. | |
| 2015/0204702 A1* | 7/2015 | Heijnsdijk | G01F 1/586 73/861.12 |

FOREIGN PATENT DOCUMENTS

| | | |
|---|---|---|
| DE | 4114537 A1 | 11/1992 |
| DE | 19708857 A1 | 7/1998 |
| DE | 102008052649 A1 | 5/2010 |
| DE | 102009006733 A1 | 8/2010 |
| GB | 1283789 A | 8/1972 |
| JP | 58109813 A | 6/1983 |
| JP | S58109813 A | 6/1983 |

* cited by examiner

MAGNETIC-INDUCTIVE FLOWMETER DEVICE HAVING A PLURALITY OF FLOWMETER UNITS, POWER SUPPLY AND EVALUATING UNITS PROVIDED IN A COMMON HOUSING

BACKGROUND OF THE INVENTION

1. Field of the Invention

The invention relates to a magnetic-inductive flow meter with a plurality of functional units and with a housing which is common to all of the functional units, each functional unit having at least one measuring tube for the throughflow of an electrically conductive medium, a magnetic field generating apparatus for generating a magnetic field which runs at least perpendicular to the longitudinal axis of the measuring tube, and at least two measuring electrodes, a virtual connecting line of the two measuring electrodes running at least essentially perpendicular to the direction of the magnetic field which is permeating the measuring tube perpendicular to the longitudinal axis of the measuring tube.

2. Description of Related Art

Magnetic-inductive flow meters have been widely known in the prior art for decades. Reference is made by way of example to the literature citation *Technical Flow Rate Measurement* by Dr. Eng. K. W. Bonfig, 3rd edition, Vulkan-Verlag Essen, 2002, pp. 123 to 167 and also to the literature citation *Principles of Magnetic-Inductive Flow Rate Measurement* by Cert. Eng. Friedrich Hoffmann, 3rd ed., 2003, publication of the company KROHNE Messtechnik GmbH & Co. KG.

The basic principle of a magnetic-inductive flow meter for measuring the flow rate of a flowing medium goes back to Michael Faraday who suggested the use of the principle of electromagnetic induction for measuring the flow velocity of an electrically conductive medium.

According to the Faraday Induction Law, in a flowing, electrically conductive medium which is permeated by a magnetic field, an electrical field intensity arises perpendicular to the flow direction of the medium and perpendicular to the magnetic field. The Faraday Induction Law is used in magnetic-inductive flow meters in that, by means of a magnetic field generating apparatus which has at least one magnetic field coil, conventionally, two magnetic field coils, a magnetic field is generated which changes over time during a measurement process and the magnetic field at least partially permeates the electrically conductive medium which is flowing through a measuring tube. In doing so, the generated magnetic field has at least one component perpendicular to the longitudinal axis of the measuring tube and perpendicular to the flow direction of the medium.

By the statement in the introduction that each functional unit has a magnetic field generating apparatus for generating a magnetic field which runs at least also perpendicular to the longitudinal axis of the measuring tube, it is pointed out that the magnetic field does preferably run perpendicular to the longitudinal axis of the measuring tube or perpendicular to the flow direction of the medium, however it is sufficient that one component of the magnetic field runs perpendicular to the longitudinal axis of the measuring tube or perpendicular to the flow direction of the medium.

It was stated at the beginning that each functional unit includes at least two measuring electrodes, the virtual connecting line of the two measuring electrodes running at least essentially perpendicular to the direction of the magnetic field which is permeating the measuring tube. Preferably, the virtual connecting line of the two measuring electrodes, in fact, runs more or less perpendicular to the direction of the magnetic field which permeates the measuring tube.

The electrical field intensity which is produced by induction in the flowing, electrically conductive medium can be measured as electrical voltage by measuring electrodes which are directly, electrically in contact with the medium or also can be capacitively detected by electrodes which are not directly electrically in contact with the medium. Then, the flow rate of the flowing medium through the measuring tube is derived from the measured voltage.

The measurement error in the magnetic-inductive flow meters known from the prior art is relatively small today; a measurement error less than 0.2% can be accomplished.

Examples of known magnetic-inductive flow meters are German patent disclosure documents 197 08 857, 10 2004 063 617 (which corresponds to U.S. Pat. No. 7,261,001 B2), 10 2008 057 755 (which corresponds to U.S. Pat. No. 8,286,503 B2) and 10 2008 057 756 (which corresponds to U.S. Pat. No. 8,286,502 B2) which are hereby incorporated by reference into this patent application.

In a host of applications, it is necessary to arrange and operate several magnetic-inductive flow meters adjacent to one another.

For the following considerations, a first and a second magnetic-inductive flow meter are adjacent when at least the magnetic field which has been generated by the magnetic field generating apparatus of the first flow meter at least partially permeates the measuring tube of the second flow meter. Of course, an adjacent arrangement is not limited to two flow meters.

Often it is not possible, for example, under limited conditions of space, to choose the 3-dimensional distance of magnetic-inductive flow meters to be so great that they are not adjacent, i.e., are far enough apart that the field generated by one does not affect the other. Shielding of the flow meters would be associated with additional costs and effort.

If the first flow meter and the second flow meter in operation are carrying out measurement processes, on the one hand, it is unknown whether the measurement processes of the two adjacent flow meters are overlapping in time, and on the other hand, in the case of time overlapping, it is unknown how great the generally inconstant time overlapping is.

If time overlapping of the measurement processes of the two adjacent flow meters is assumed, in the measuring tube of the second flow meter, the magnetic field which has been generated by the magnetic field generating apparatus of the second flow meter and the magnetic field which has been generated by the magnetic field generating apparatus of the first flow meter and which extends to the measuring tube of the second flow meter are superimposed. The superposition of the two magnetic fields results in an induced electrical voltage which varies in an unknown manner and a corresponding influence on the flow rate measurements; this means a reduction of the measurement quality. Thus, for example, at a constant flow through the measuring tube of a flow meter a varying flow rate can be displayed by the flow meter. Of course, the measurement process of the second flow meter also influences the measured value of the flow rate of the first flow meter.

German patent application 10 2011 112 763.5 and corresponding U.S. Patent Application Publication 2013/0061685 A1 (which are not prior art) relate to the problem of improving the measurement quality for adjacent magnetic-inductive flow meters and an improved arrangement of adjacent magnetic-inductive flow meters. The process of these disclosures teaches the synchronization of measurement processes of individual adjacent flow meters to prevent variations of mutual influences on the flow rate measurements by the magnetic fields of adjacent magnetic-inductive flow meters.

According to what was stated in the introduction, here, it is not a matter of three-dimensionally separate, but adjacently located magnetic-inductive flow meters, but rather a magnetic-inductive flow meter with a plurality of functional units and with a housing which is common to all functional units. It is therefore a matter of several magnetic-inductive flow meters which are not 3-dimensionally separated to the extent that they have a common housing. This flow meter is produced and marketed by the company Kirchgaesser Industrie Elektronik GmbH under the name "MULTIMIDEX".

SUMMARY OF THE INVENTION

The object of the invention is to devise a magnetic-inductive flow meter of the initially described type which has a relatively simple structure and which can be easily produced.

The object of the invention is, first of all, characterized essentially in that a common medium inflow connection or a common medium outflow connection are provided in the housing for the measuring tubes of all functional units and/or a common power supply is provided in the housing for the magnetic field generating apparatus of all functional units and/or a common evaluation unit is provided in the housing for the measuring electrodes of all functional units.

Therefore, for the object of the invention, first of all, there are three approaches, specifically:
a) the implementation of a common medium inflow connection or a common medium outflow connection for the measuring tubes of all functional units in the housing,
b) the implementation of a common power supply for the magnetic field generating apparatus of all functional units in the housing,
c) the implementation of a common evaluation unit for the measuring electrodes of all functional units in the housing.

The aforementioned three approaches can be alternatively or—in part or in whole—cumulatively implemented, therefore alternatively a) or b) or c), or cumulatively a) and b), a) and c), b) and c) or a) and b) and c).

Magnetic-inductive flow meters in accordance with the invention as explained above can be configured and developed in diverse ways; this applies especially to the indicated approaches b) and c).

In magnetic-inductive flow meters of the initially described type and consequently also of the type in accordance with the invention, the magnetic field generating apparatus of all functional units have at least one field coil, often also two field coils. On this basis another teaching of the invention consists in connecting the field coils of all functional units in series. This enables not only a common power supply for the magnetic field generating apparatus of all functional units, this also leads to all field coils being synchronously triggered at the same time and feed-through of the magnetic fields between the functional units which are very close to one another being constant and being able to be incorporated into the calibration.

In magnetic-inductive flow meters in accordance with the invention in which the aforementioned approach c) is implemented, the electrode voltages which arise on the measuring electrodes of the individual functional units are of course measured separately, but in parallel, i.e. in measurement phases which are the same for all functional units.

In magnetic-inductive flow meters in accordance with the invention in which the approach c) is implemented, it is furthermore recommended that downstream of the measuring electrodes which belong to the individual functional units its own preamplifier is connected.

In the magnetic-inductive flow meters on which the invention is based and in the magnetic-inductive flow meters in accordance with the invention, the electrode voltages arising on the measuring electrodes of the individual functional units are analog measured values. Since it is advantageous to work with digital measured values, it is recommended that the initially arising analog measured values be digitized, therefore, downstream of the measuring electrodes which belong to the individual functional units for which purpose an A/D converter is connected to each of the functional units. If downstream of the measuring electrodes which belong to the individual functional units its own preamplifier is connected, the A/D converter will be connected downstream of the preamplifiers.

Otherwise, in magnetic-inductive flow meters in accordance with the invention in which the aforementioned approach c) is implemented and downstream of the measuring electrodes which belong to the individual functional units its own A/D converter is connected, optionally downstream of the preamplifiers, prior art which is conventional today in conjunction with A/D converters will be used. Thus, the A/D converters can be interrogated over a digital bus, for example, $I^2C$ or SPI, and the sampling rate can be chosen to be so high that no sampling values of the A/D converters are lost, or provision can be made for the A/D converters to store the sampling values until there are new measured values.

What was explained above relates to the primary functionality of magnetic-inductive flow meters, specifically the measurement of the flow rate of electrically conductive media through a measuring tube. But there is no necessity of limiting the embodiment and development of magnetic-inductive flow meters thereto with respect to their primary functionality; secondary functionalities can also be implemented.

First of all, a so-called secondary functionality can be implemented by at least one functional unit, preferably all functional units, having a circuit for measuring conductivity, for detecting the medium and/or for detecting no-load operation. Conductivity can be measured, the medium can be detected or no-load operation can be ascertained in all functional units at the same time (parallel operation) or in succession (serial operation) or also only for selected functional units (selective operation). For measuring conductivity, per functional unit a difference current with changing polarity between the two measuring electrodes can be impressed and the conductivity between the measuring electrodes can be determined via the measurement of the voltage on the measuring electrodes.

Otherwise, in the magnetic-inductive flow meter in accordance with the invention, each functional unit can acquire its own set of calibration values which is used for computing the different measured values, especially for measuring the flow rate and optionally the conductivity. The calibration values can include a detector constant, a factor of the calibration value for measuring the flow velocity, a zero point constant, a constant for the offset of the calibration value for the measurement of the flow velocity, an electrode factor, a factor for measuring the conductivity, and a nominal width constant, and a constant for the diameter of the respective functional unit for computing the volumetric flow rate based on the measurement of the flow velocity.

So that magnetic-inductive flow meters in accordance with the invention can communicate with the "outside world", a preferred embodiment is characterized in that the evaluation unit has an outside digital bus interface, for example, a Can bus, a Mode bus, Profibus, FF, Ethernet, ASI. Via the digital bus interface, the individual flow rate values, optionally also the individual conductivity values, can be read out. The digital bus interfaces can also be used for reading out the results of flow rate monitoring, for example, boundary value monitoring. Calibration values can also be set via the digital bus interface.

Magnetic-inductive flow meters in accordance with the invention are preferably used in machines, for example, in cleaning machines in which water, in any case moisture, can arise, in any case in certain regions of these machines. In this respect, another teaching of the invention is that the evaluation unit of magnetic-inductive flow meters in accordance with the invention is implemented in an IP-66 housing, an IP-67 housing or an IP-68 housing (IP stands for "Ingress Protection" with the first digit representing the level of dust protection and the second digit representing the level of water protection, 66 being no dust can enter and water jets can be withstood, while 67 indicates water immersion can be resisted). In conjunction with this, or also instead of it, in the magnetic-inductive flow meters, in accordance with the invention, it is recommended that low voltage be used, therefore the connection to the line voltage, conventionally 230 V AC voltage via a separate power pack, be provided.

In particular there are various possibilities for embodying and developing the magnetic-inductive flow meter in accordance with the invention. In this respect reference is made to the exemplary embodiment which is shown only very schematically in the drawings and which is described below.

DETAILED DESCRIPTION OF THE INVENTION

Figure 1:
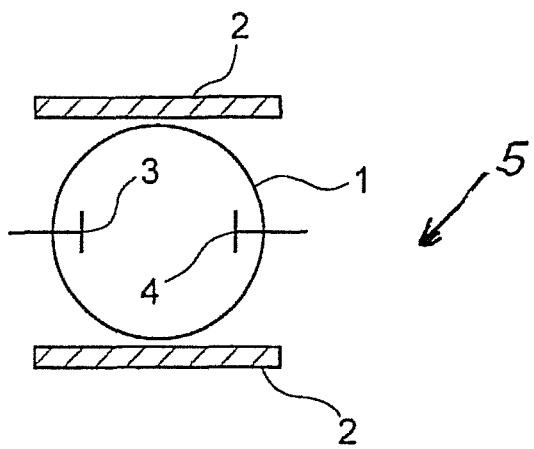
FIG. 1 very schematically shows the fundamental structure of a magnetic-inductive flow meter, FIG. 2 very schematically shows a magnetic-inductive flow meter with a plurality of functional units.

The figures show a magnetic-inductive flow meter which includes fundamentally, as indicated in FIG. 1, a measuring tube 1 for the throughflow of an electrically conductive medium, a magnetic field generating apparatus 2 for generating a magnetic field which runs perpendicular to the longitudinal axis of the measuring tube 1 and at least two measuring electrodes 3, 4, the virtual connecting line of the two measuring electrodes 3, 4 running at least essentially perpendicular to the direction of the magnetic field which is permeating the measuring tube 1 perpendicular to the longitudinal axis of the measuring tube 1.

Figure 2:
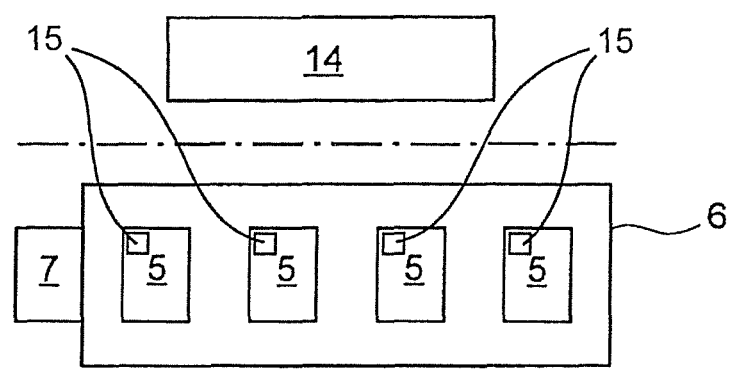

FIG. 2 suggests that the magnetic-inductive flow meter under consideration has a plurality of functional units 5 and a housing 6 which is common to all functional units 5, each functional unit 5 being made as was stated above in conjunction with FIG. 1 for the fundamental structure of magnetic-inductive flow meters.

Figure 3:
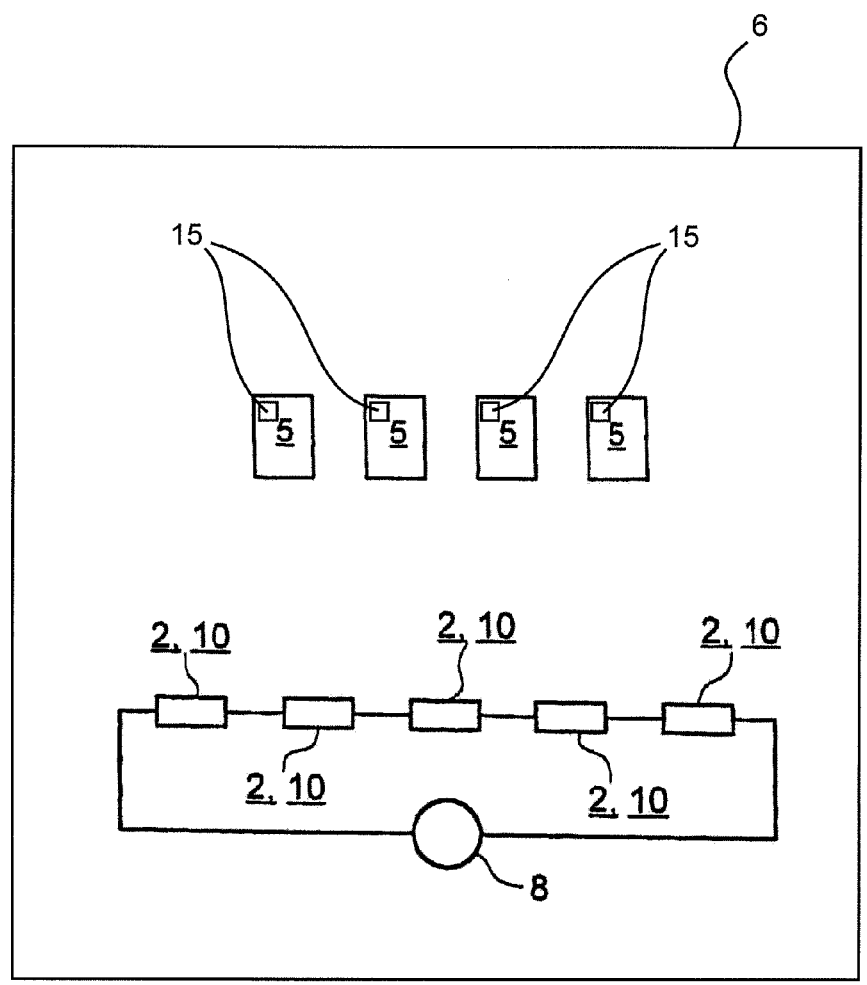
FIG. 3 shows a first detail from a preferred embodiment of a magnetic-inductive flow meter in accordance with the invention.

It is indicated in FIG. 2 that it applies to the illustrated magnetic-inductive flow meter that a common medium supply connection 7 is implemented in the housing 6 for the measuring tubes 1 of all functional units 5. Conversely, it is indicated in FIG. 3 that a common power supply 8 is implemented in the housing 6 for the magnetic field generating apparatus 2 of all functional units 5. Finally, it is indicated in FIG. 4 that a common evaluation unit 9 is implemented in the housing 6 for the measuring electrodes 3, 4 of all functional units 5.

The magnetic field generating apparatus 2 are also only schematically suggested in FIG. 1 which shows very schematically the fundamental structure of magnetic-inductive flow meters. Conversely, FIG. 3 shows that the magnetic field generating apparatus 2 of all functional units 5 have at least one field coil 10. It is easily recognizable that the field coils 10 of all functional units are connected in series.

It is not shown that the evaluation unit 9 is preferably made such that the electrode voltages which arise on the measuring electrodes 3, 4 of the individual functional units 5 are measured separately, but in parallel, i.e., in measurement phases which are the same for all functional units 5.

Figure 4:
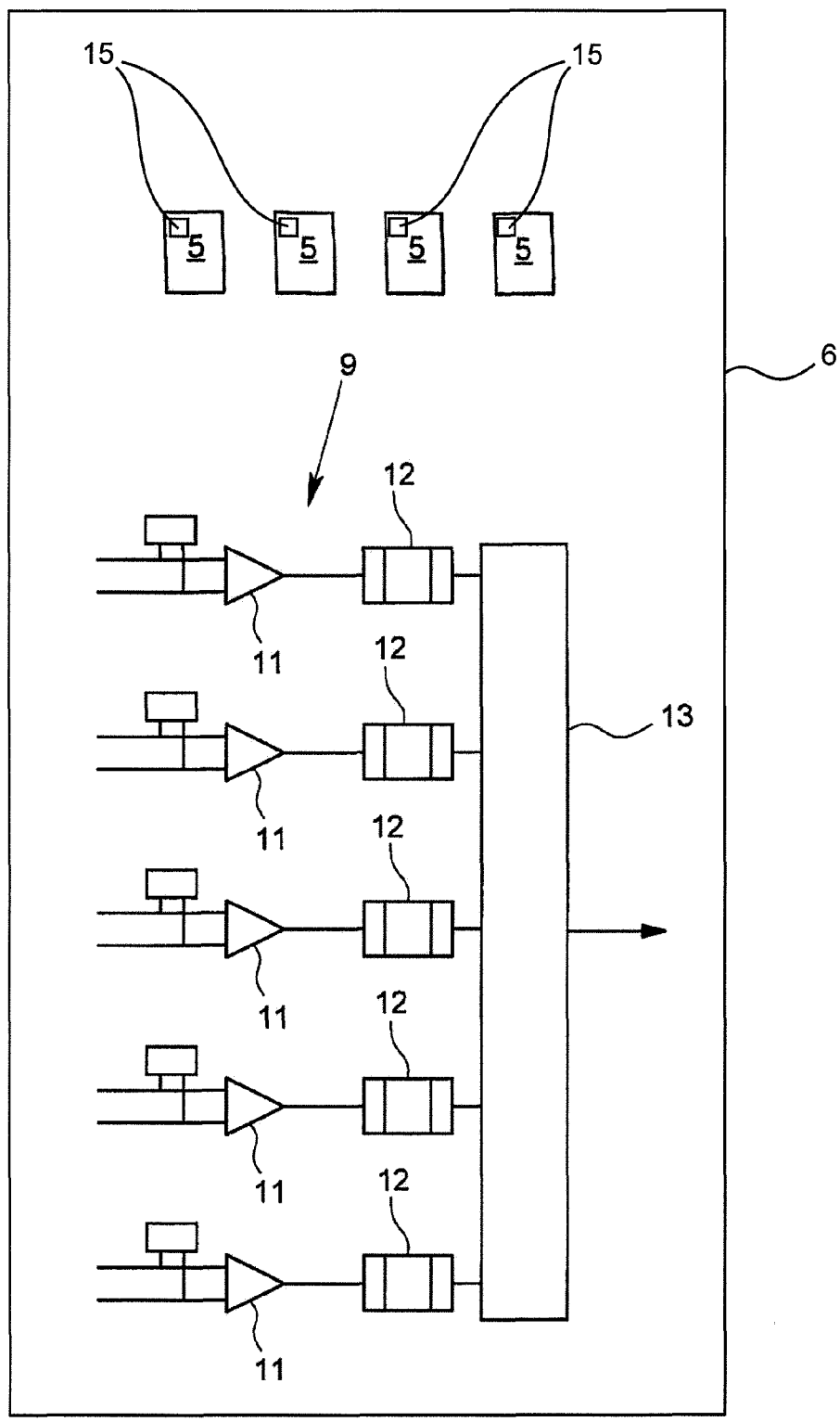
FIG. 4 shows a second detail from a preferred embodiment of a magnetic-inductive flow meter in accordance with the invention.

FIG. 4 shows details relating to the evaluation unit 9 which is implemented jointly for the measuring electrodes 3, 4 of all functional units 5. In particular, first of all, each of the measuring electrodes 3, 4 which belong to the individual functional units 5 includes its own preamplifier 11. Moreover, downstream of the measuring electrodes 3, 4 which belong to the individual functional units 5, its own A/D converter 12 is connected. In particular, the A/D converters 12 are connected downstream of the preamplifiers 11.

It is not shown in the figures that the A/D converters 12 can be interrogated over a digital bus, for example, $I^2C$ or SPI, that the sampling rate is so high that no sampling values of the A/D converters 12 are lost and that the A/D converters 12 store the sampling values until there are new measured values. It is not shown either that at least one functional unit 5, preferably all functional units 5, have a circuit 15 for measuring conductivity, for detecting the medium and/or for detecting no-load operation.

Finally, in FIG. 4 it is indicated that the evaluation unit 9 has a digital bus interface 13 which lies outside.

Magnetic-inductive flow meters in accordance with the invention should preferably be able to be used in machines, for example, in cleaning machines in which water, in any case moisture, can arise, in any case in certain regions of these machines. In this respect, in the magnetic-inductive flow meters in accordance with the invention, the housing 6 is implemented preferably as an IP-66 housing, as an IP-67 housing or as an IP-68 housing. In conjunction with this, or also instead of it, in the magnetic-inductive flow meters in accordance with the invention low voltage is used, therefore the connection to the line voltage, conventionally 230 V AC voltage, is effected via a separate power pack 14, as indicated in FIG. 2.

The invention claimed is:

1. A magnetic-inductive flow meter, comprising:
   a plurality of functional units, each functional unit having
   at least one measuring tube for the throughflow of an electrically conductive medium, a magnetic field generating apparatus for generating a magnetic field which runs at least also perpendicular to a longitudinal axis of the measuring tube, and at least two measuring electrodes, a virtual connecting line of the at least two measuring electrodes running at least essentially perpendicular to the direction of the magnetic field which is permeating the measuring tube perpendicular to the longitudinal axis of the measuring tube,
a housing which is common to all of the functional units, the housing having a common medium inflow connection or a common medium outflow connection for the measuring tubes of all functional units, and
evaluation electronics associated with the measuring electrodes,
wherein a power supply for the magnetic field generating apparatus and for the evaluation electronics is a low voltage supply, and
wherein the magnetic field generating apparatus of all of the functional units, each comprises at least one field coil, wherein the field coils of all of the functional units are connected in series.

2. The magnetic-inductive flow meter as claimed in claim 1 wherein a common evaluation unit containing the evaluation electronics for the measuring electrodes of all functional units is provided.

3. The magnetic-inductive flow meter as claimed in claim 2, wherein the evaluation unit is made such that electrode voltages which arise on the measuring electrodes of the individual functional units are measured separately, but in parallel.

4. The magnetic-inductive flow meter as claimed in claim 2, wherein in the evaluation unit has an outside digital bus interface.

5. The magnetic-inductive flow meter as claimed in claim 2, wherein the evaluation unit is provided in one of an IP-66 housing, an IP-67 housing and an IP-68 housing.

6. The magnetic-inductive flow meter as claimed in claim 1, wherein a preamplifier is connected downstream of the measuring electrodes of each the individual functional units.

7. The magnetic-inductive flow meter as claimed in claim 6, wherein an A/D converter is connected downstream of the measuring electrodes of each of the individual functional units.

8. The magnetic-inductive flow meter as claimed in claim 7, wherein the A/D converters are connected downstream of the preamplifiers.

9. The magnetic-inductive flow meter as claimed in claim 7, wherein the A/D converters are interrogatable over a digital bus.

10. The magnetic-inductive flow meter as claimed in claim 9, wherein the A/D converters are interrogated at a sampling rate that is high enough that no sampling values of the A/D converters are lost.

11. The magnetic-inductive flow meter as claimed in claim 7, wherein the A/D converters are adapted to store sampling values until there are new measured values.

12. The magnetic-inductive flow meter as claimed in claim 1, wherein the power supply for the magnetic field generating apparatus and for the evaluation electronics is a low voltage power supply.

13. The magnetic-inductive flow meter as claimed in claim 1, wherein all of the functional units have a circuit for at least one of measuring conductivity, detecting the medium and detecting no-load operation.

14. A magnetic-inductive flow meter, comprising:
a plurality of functional units, each functional unit having at least one measuring tube for the throughflow of an electrically conductive medium, a magnetic field generating apparatus for generating a magnetic field which runs at least also perpendicular to a longitudinal axis of the measuring tube, and at least two measuring electrodes, a virtual connecting line of the at least two measuring electrodes running at least essentially perpendicular to the direction of the magnetic field which is permeating the measuring tube perpendicular to the longitudinal axis of the measuring tube, and
a housing which is common to all of the functional units, the housing having a common power supply for the magnetic field generating apparatus of all functional units, and
evaluation electronics associated with the measuring electrodes,
wherein the common power supply for the magnetic field generating apparatus and for the evaluation electronics is a low voltage supply, and
wherein the magnetic field generating apparatus of all of the functional units, each comprises at least one field coil, wherein the field coils of all of the functional units are connected in series.

15. The magnetic-inductive flow meter as claimed in claim 14, wherein at least one functional unit has a circuit for at least one of measuring conductivity, detecting the medium and detecting no-load operation.

16. The magnetic-inductive flow meter as claimed in claim 14, wherein all of the functional units have a circuit for at least one of measuring conductivity, detecting the medium and detecting no-load operation.

17. A magnetic-inductive flow meter, comprising:
a plurality of functional units, each functional unit having at least one measuring tube for the throughflow of an electrically conductive medium, a magnetic field generating apparatus for generating a magnetic field which runs at least also perpendicular to a longitudinal axis of the at least one measuring tube, and at least two measuring electrodes, a virtual connecting line of the at least two measuring electrodes running at least essentially perpendicular to the direction of the magnetic field which is permeating the at least one measuring tube perpendicular to the longitudinal axis of the at least one measuring tube, and
a housing which is common to all of the functional units, the housing having an evaluation unit which is common to all of the functional units,
wherein a power supply for the magnetic field generating apparatus and for the evaluation unit is low voltage power supply, and
wherein the magnetic field generating apparatus of all of the functional units, each comprises at least one field coil, wherein the field coils of all of the functional units are connected in series.

18. The magnetic-inductive flow meter as claimed in claim 17, wherein at least one functional unit of the plurality of functional units has a circuit for at least one of measuring conductivity, detecting the medium and detecting no-load operation.

* * * * *